INVENTOR.
WILLIAM J. DOERR
BY *Herbert L. Davis*
ATTORNEY

INVENTOR.
WILLIAM J. DOERR
BY
ATTORNEY

United States Patent Office 2,954,648
Patented Oct. 4, 1960

2,954,648

AUTOMATIC FEEDER AND DISCHARGE DEVICE FOR A CENTERLESS GRINDER MECHANISM

William J. Doerr, Fair Lawn, N.J., assignor to The Bendix Corporation, a corporation of Delaware Filed Oct. 22, 1958, Ser. No. 768,949

8 Claims. (Cl. 51—103)

This invention relates to an automatic feeder and discharge device and more particularly to a device including novel means for automatically feeding a round stock shaft or workpiece to a work-supporting blade for a grinding operation, together with novel means for discharging the workpiece from the blade upon completion of the grinding operation.

An object of the invention is to provide a novel feeder and discharge device for a centerless grinder which may be of a type such as described in U.S. Patent No. 2,851,828, granted September 16, 1958, to A. W. Todd et al.

Another object of the invention is to provide a feeder means for a centerless grinder in which workpieces are fed into and through a chute to a point in an automatic feeder device at which the workpieces are held by a stop pin which is in turn periodically released by the operation of the mechanism of the device so that one workpiece at a time is fed under force of gravity onto two arms arcuately movable by the mechanism so as to carry the workpiece to a work-supporting blade for a grinding operation and in which arrangement there is provided a notched regulating wheel continuously rotated in timed relation with the feeder device so that upon completion of the grinding operation the regulating wheel is so positioned that the notch in the regulating wheel is adjacent the work-supporting blade, whereupon the workpiece under the rotary force of the grinding wheel is discharged into the notch in the regulating wheel which continues to rotate so that the regulating wheel ultimately discharges the workpiece from the notch under force of gravity into a receiving pan, whereupon the foregoing operation is repeated with respect to another workpiece fed to the work-supporting blade by the aforementioned operation of the mechanism of the device.

Another object of the invention is to provide a novel mechanical arrangement in which there are provided two hook-shaped arms for carrying a workpiece, the arms projecting from a main operating member pivotally mounted under spring tension and including a third arm actuated by a cam surface upon arcuate movement of the main operating member in one sense so as to impart a pivotal movement to the main operating member to cause the two carrying arms to release the workpiece at a work rest position between a grinding wheel and regulating wheel and thereafter the cam surface causes the main operating member under spring tension to be pivoted in an opposite direction upon arcuate movement of the main operating member in an opposite sense so as to cause the hook-shaped arms to be retracted for receiving a new workpiece.

Another object of the invention is to provide in a centerless grinder of the aforenoted type a regulating wheel notched along its width and so arranged in relation to a work-supporting blade that the regulating wheel may be rotated so as to receive in the notch the workpiece upon completion of the grinding operation.

Another object of the invention is to provide in a centerless grinder of the aforenoted type a notched regulating wheel having an actuating member cooperating with operating elements of a releasable stop pin device and a main operating member so as to effect the aforenoted workpiece feeding and discharging operations in a predetermined timed relation.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Referring to the drawings.

Figure 1:
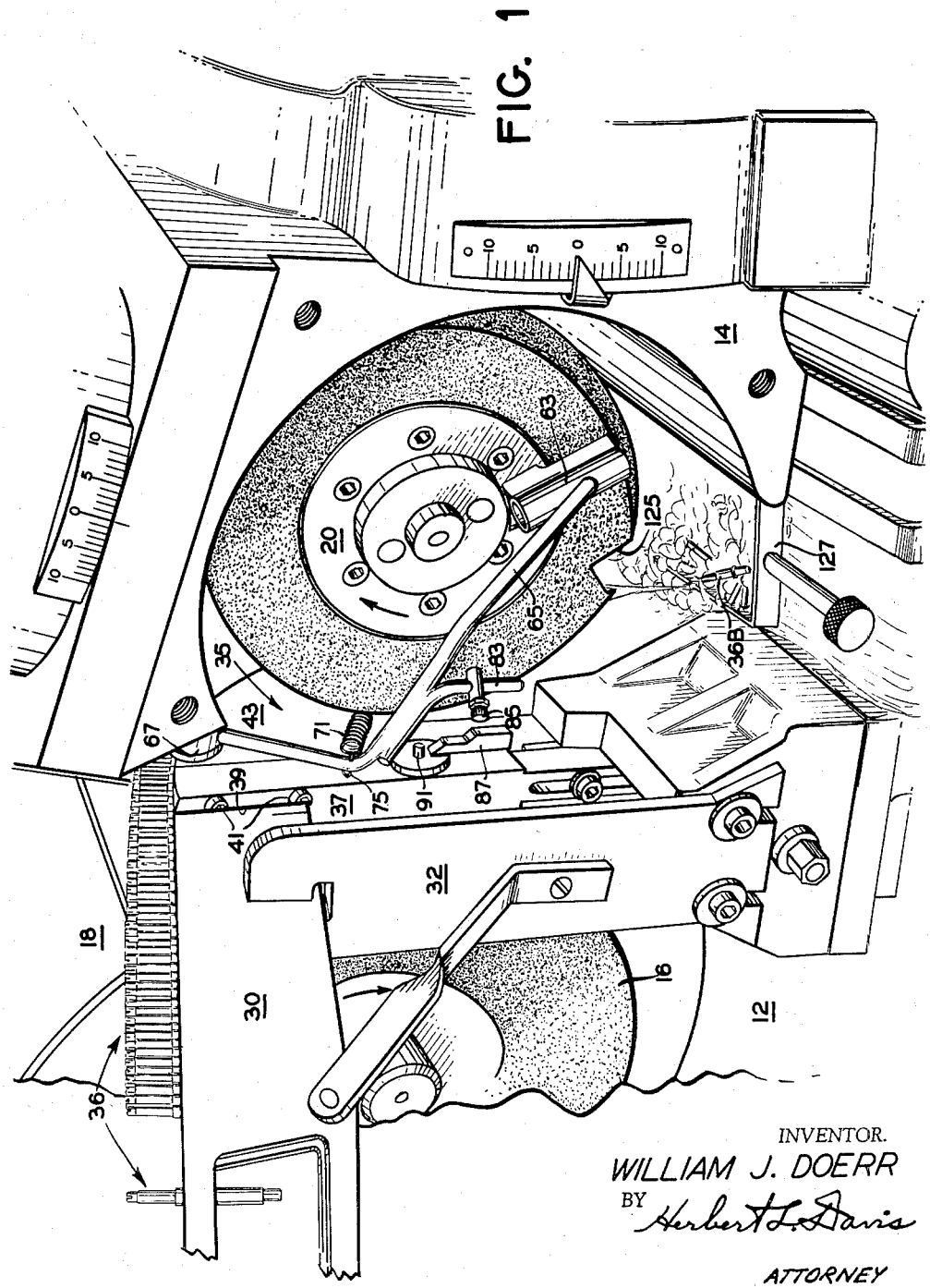
Figure 1 is a front view of a centerless grinder embodying an improved automatic feeder and discharge device constructed in accordance with this invention.

As will be readily understood from Figure 1, that the centerless grinder incorporating the features of the automatic feeder and discharge device of the present invention is similar in many respects to conventional centerless grinders.

That is, the grinder includes a conventional bed 10 upon which a grinding wheel assembly 12 and regulating wheel assembly 14 are mounted. The grinding wheel assembly 12 includes an abrasive wheel 16 mounted on a spindle which is rotatably supported in a housing (not shown) and covered by a guard 18. The entire grinding wheel assembly 12 is quite conventional and only so much of it is shown as is necessary to show the relationship of the grinding wheel 16 to the regulating wheel assembly 14 including a regulating wheel 20, and it is deemed unnecessary to show or to describe the grinding wheel drive structure, the wheel dressing apparatus or the coolant system for the grinding wheel or drive structure for the regulating or control wheel 20.

Figure 2:
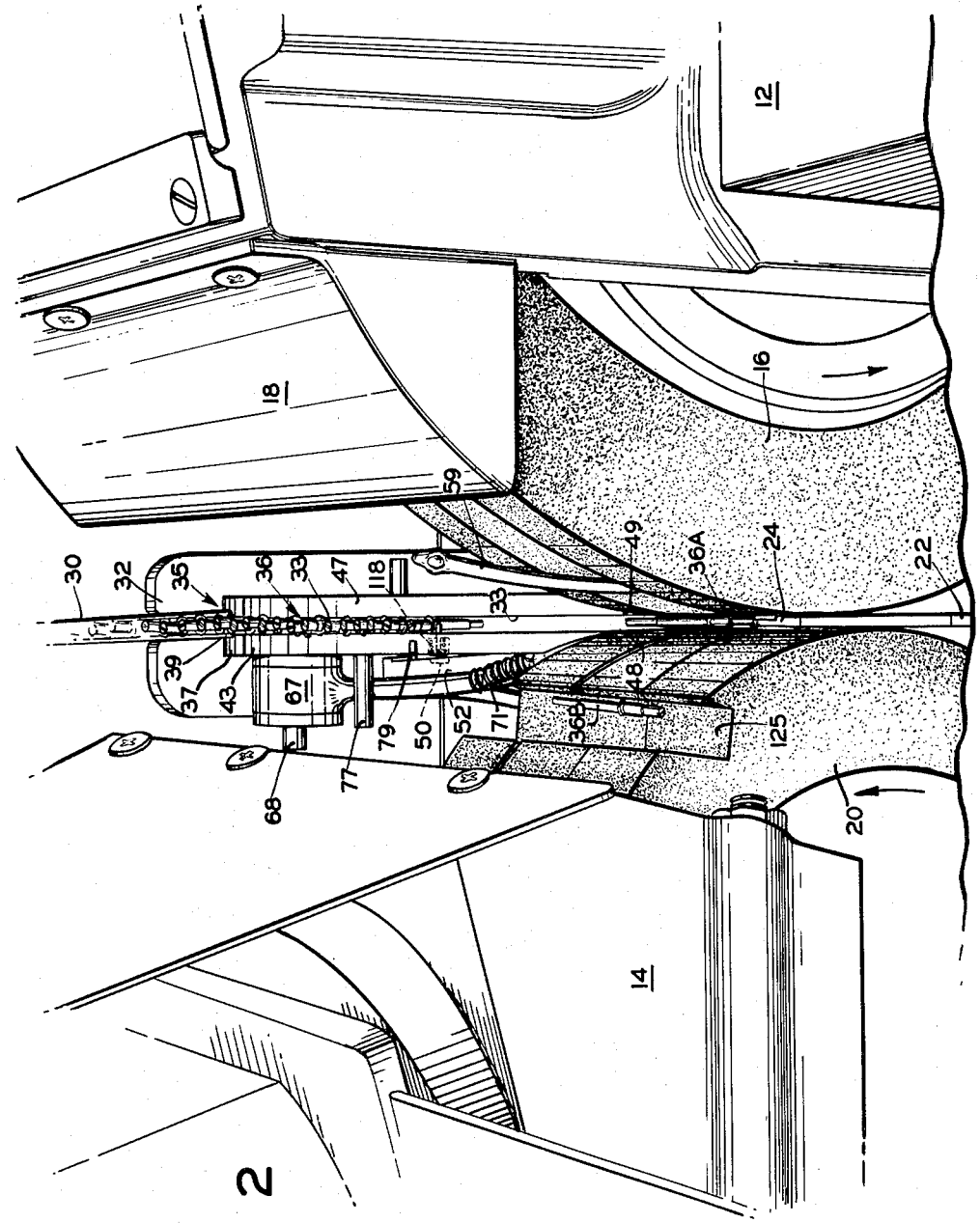
Figure 2 is an enlarged back view of the centerless grinder of Figure 1.

In accordance with conventional practice, the grinding wheel assembly 12 is fixedly or adjustably mounted on the bed 10 so that the grinding wheel 16 is disposed in generally opposed relationship to the regulating or control wheel 20 forming a part of the regulating wheel assembly 14, and in further accord with conventional practice, there is shown by Figure 2, a work rest 22 mounted on the bed 10 between the said grinding and regulating wheels. A work-supporting blade 24 is secured to the work rest to support the work, as shown in Figure 2, for engagement by the grinding wheel and the regulating wheel.

As thus far described, the centerless grinder is constructed in accordance with known practice. The operation of the machine is also conventional and the grinding wheel 12 and regulating wheel 20 rotate respectively in downward and upward directions relative to the work supporting blade 24, as indicated by the arrows in Figures 1 and 2.

The grinder is arranged for an automatic through-feed operation in the provision of the improved feeder and discharge device of the present invention. In the novel feeder device there is provided, as shown in Figures 1 and 2, a chute 30 carried by supports 32 and leading from a loading device of conventional type (not shown) into a slot 33 of the feeder device 35. Workpieces or round stock shafts 36 rest in the chute 30 on previously machined shoulders of the shafts and are fed under force of gravity down the chute 30 into the slot 33 of the feeder device 35.

The feeder device 35 has an end plate 37 slotted at 39 for receiving an end of the chute 30. There is affixed to the end plate 37 by bolts 41 a side plate 43, shown in Figure 3, and by bolts 45 another side plate 47, shown in Figure 4. The side plates 43 and 47 have outer arcuate edge surfaces 44 and 46, respectively, and as shown in Figures 2 and 4, the side plates 43 and 47 are secured in a spaced relation one to the other so as to form the slot 33 in which the workpieces 36 are slidably movable under the force of gravity along the outer arcuate edge surfaces 44 and 46. The side plates 43 and 47 have tapered lower end portions 48 and 49 arranged, so as to fit closely between the grinding wheel 16 and regulating wheel 20 with the tapered end portion 49 extending slightly further downward toward the blade 24 than the portion 48 so as to guide the workpiece 36A toward the work rest blade 24, as shown in Figure 2.

The movement of the workpiece 36 in the slot 33 is controlled, as best shown in Figure 2, by a releasable stop pin device 50 operated by a cam member 52 of the operating mechanism of the device, as hereinafter explained, so as to feed one workpiece 36 at a time onto two hook-shaped members 55 and 57 mounted at the free ends of arms 59 and 61, respectively, so that the workpiece, as indicated by numeral 36A, under force of gravity, is guided by the arms 59 and 61 along the arcuate edge surfaces 44 and 46 and to the work rest blade 24 between the grinding wheel 16 and regulating wheel 20. In the last-mentioned operation, the tapered ends 48 and 49 cooperate with the arms 59 and 61 in guiding the workpiece 36A into place on the work rest blade 24.

The operating mechanism for the feeder device includes, as shown in Figure 1, a cam element 63 affixed to the regulator wheel 20 and rotatably thereby in cooperating relation with actuating arm 65 of the feeder device.

Figure 3:
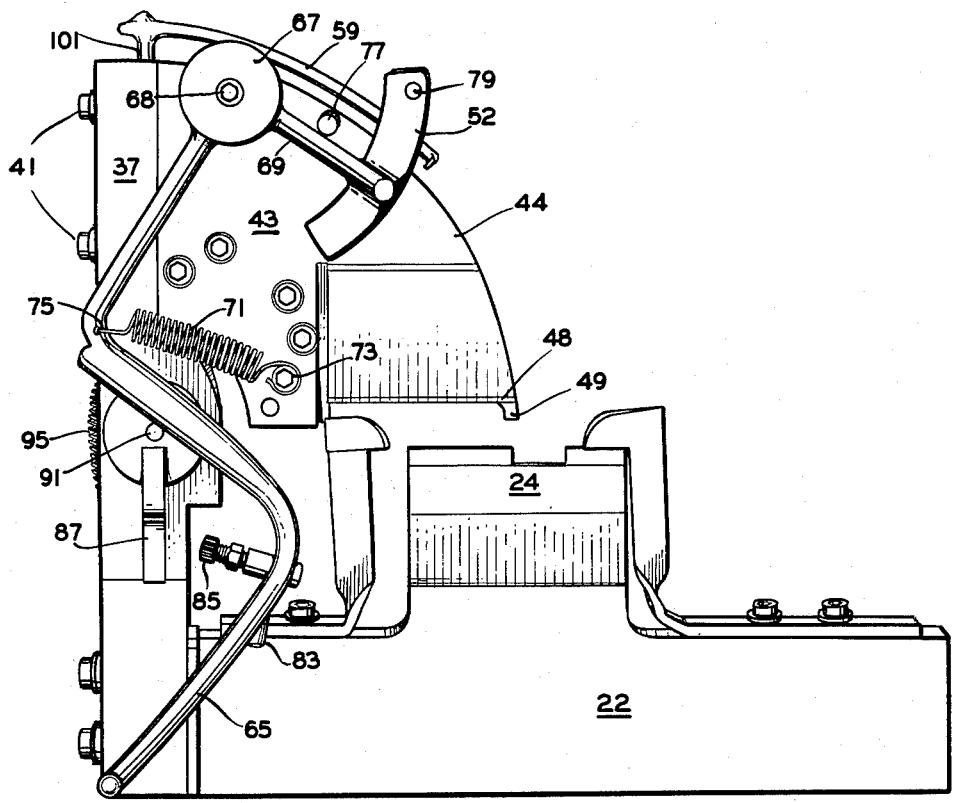
Figure 3 is an enlarged view of one side of the feeder device of Figure 1 showing the operative mechanism.
Figure 4:
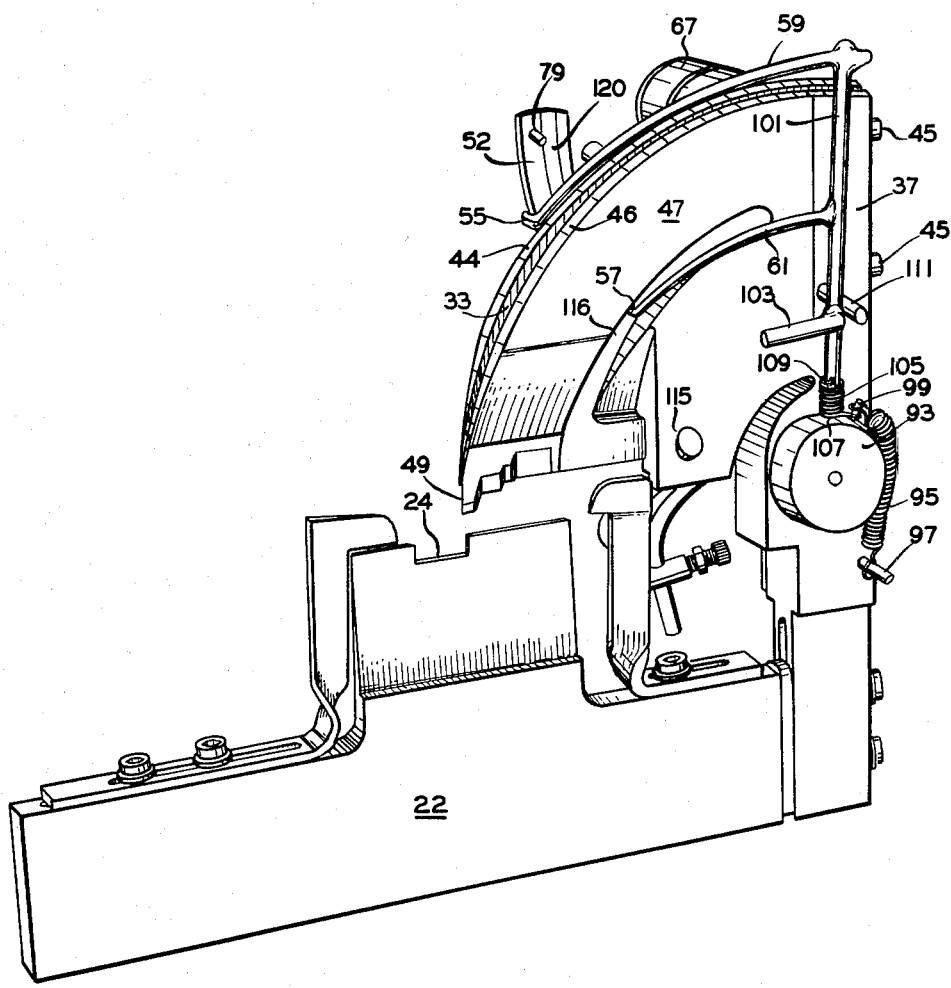
Figure 4 is an enlarged perspective view of the opposite side of the feeder device of Figure 3.

As shown in Figure 3, the actuating arm 65 is pivotally mounted at hub portion 67 on a pin 68 projecting from the side plate 43 of the feeder device and has affixed to the hub portion 67 an arm 69 operably connected so as to adjustably position the cam member 52. As shown in Figure 3, the actuating arm 65 is biased by a spring 71 connected at one end by a bolt 73 to the side plate 43 and at an opposite end 75 to the actuating arm 65. The spring 71 biases the arm 65 in a counterclockwise direction about the pin 68. Movement of the arm 65 under the biasing force of the spring 71 is limited by a stop pin 77 projecting from the side plate 43, while movement of the arm 65 in an opposite clockwise direction about the pin 68 is limited by a pin 79 projecting from the cam member 52, and contacting when in a limiting relation the outer edge surface 44 of the side plate 43, as shown in Figure 2.

Affixed to the arm 65 is an additional arm 83 having mounted thereon an adjustable actuating element 85 arranged for operative engagement with an arm 87 initially positioned in spaced relation to the actuating element 85, as best shown in Figures 1 and 3. The arm 87 is affixed to a shaft 91 which projects through and is pivotally mounted in the end plate 37. At the opposite end of the shaft 91 there is affixed thereto a hub element 93, as shown in Figure 4.

The hub element 93 is biased by a spring element 95 in a clockwise direction, as shown in Figure 4. The spring 95 has one end connected by a pin 97 to the end member 37 while the opposite end of the spring 95 is connected by a bolt 99 projecting from the hub 93.

Pivotally mounted in the hub 93 is a main control arm 101 having projecting therefrom the arms 59, 61, and 103. A second spring 105 surrounds the main control arm 101 and has one end 107 fixed to the hub 93 while the opposite end 109 of the spring 105 is affixed in the main control arm 101 so as to bias the main control arm 101 in a sense causing the projecting arm 103 to operatively contact the outer surface of the end plate 47, so as to thereby limit pivotal movement of the main control arm 101 under the biasing force of the spring 105. A stop pin 111 projecting from the end plate 37 limits the movement of the main control arm 101 in an arcuate sense under the biasing force of the spring 95.

Projecting from the side plate 47 is a cam element 115 arranged so as to cooperatively contact the arm 103 upon an extreme arcuate movement of the main control arm 101 in a counterclockwise direction as viewed in Figure 4. The cam element 115 may effect upon such contacting engagement with the arm 103 pivotal movement of the main control arm 101 against the biasing force of the spring 105 and a movement of the arms 59 and 61 in a direction away from the side plate 47.

As shown in Figure 4, the hook-shaped end 57 of the arm 61 projects through an arcuate slot 116 formed in the side plate 47 and into the slot 33 so that upon the stop pin 50, shown in Figure 2, being withdrawn, the workpieces 36 under force of gravity slide down the slot 33 and along the arcuate edges 44 and 46 so as to permit the leading workpiece 36 to rest on the hook-shaped ends 55 and 57 of the arms 59 and 61, respectively, shown in Figure 4.

The stop pin device 50 is biased by a spring 118, shown in dotted lines in Figure 2, into contacting relation with a cam surface 120 in the cam member 52. In the initial position of the cam member 52, shown in Figures 3 and 4, the effective cam surface 120 is depressed so that the stop pin device 50 is biased by the spring 118 into a release position in which the stop pin is withdrawn so that the leading workpiece 36 rests, as aforesaid, on the hook-shaped ends 55 and 57.

Upon a movement of the actuating arm 65 by the cam element 63 from the aforesaid initial position, the resulting movement of the cam member 52 brings into operation a rise in the effective cam surface 120 which acts in cooperate relation with the stop pin 50 so as to cause the same to be projected into the slot 33 to a position limiting movement of the next succeeding workpiece 36. Further movement of the actuating arm 65 in a clockwise direction does not change the effective cam surface and thereafter causes the arm 85 to operatively engage the arm 87, whereupon still further movement of the actuating arm 65 effects a movement of the main control arm 101 in an arcuate counterclockwise direction, as viewed in Figure 4, until the hook-shaped ends 55 and 57 of the arms 59 and 61 carry the one released workpiece 36 acting under force of gravity along the arcuate edge surfaces 44 and 46 and to a position adjacent the work blade 24 between the grinding wheel 16 and regulating wheel 20. Upon a further arcuate movement of the main control arm 101 in the counterclockwise direction the arm 103 rides up upon the surface of the cam element 115 effecting a pivotal movement of the main control arm 101 in opposition to the biasing force of the spring 105, whereupon the hook-shaped ends 55 and 57 release the workpiece, indicated in Figure 2 by the numeral 36A.

Thereafter upon the cam element 63 being rotated so as to release the actuating arm 65, the main control arm 101 and attendant arms 59, 61 and 103 are retracted under tension of spring 95 in an arcuate clockwise direction, as viewed in Figure 4, while the main control arm 101 and the arms 59, 61 and 103 resume the initial pivotal position under tension of spring 105 upon arm 103 being moved out of contacting relation with the surface of cam element 115.

Similarly, as viewed in Figures 1 and 3, upon the cam element 63 releasing the actuating arm 65, the arm 65 under tension of spring 71 moves in a counterclockwise direction returning the cam member 52 and the cam surface 120 therein to the initial position. Thereupon the stop pin device 50 under force of spring 118 is once again retracted so as to release the workpieces 36 and permit the next workpiece 36 to rest on the hook-shaped ends 55 and 57 of the arms 59 and 61, respectively. Thereafter, the feeding operation of the workpiece 36A to the grinding machine is repeated upon the cam element 63 of the regulating wheel 20 being rotated so as to once again operatively contact the actuating arm 65, as aforesaid.

The regulating wheel 20 has a notch 125 along its width so arranged in the regulating wheel 20 in relation to the cam 63 that immediately before the cam 63 effects an actuation of the arms 59 and 61 so as to carry the workpiece 36A to the work blade 24, the rotary movement of the regulating wheel 20 positions the notch 125 adjacent the work blade 24 whereupon the completed or processed workpiece 36B is deposited in the notch 125 by the rotary force of the grinding wheel 16 on the workpiece. Thereafter, as viewed in Figure 2, the regulating wheel 20 continues to rotate in the direction indicated by the arrow so as to carry the completed workpiece 36B in the notch 125 away from the work blade 24, while the cam 63 causes the arms 59 and 61 to place the next succeeding workpiece 36A on the work blade 24 for processing by the grinding wheel 16.

Additional rotation of the regulating wheel 20 in the direction of the arrow as viewed in Figure 1 positions the notch 125 so as to discharge the workpiece 36B under force of gravity into a receiving pan 127, and thereafter the regulating wheel 20 continues to turn as indicated by the arrows in Figures 1 and 2 so as to once again position the notch 125 adjacent the work blade 24, whereupon the discharge operation is repeated.

There is thus provided a mechanism for automatically feeding round stock shafts or workpieces into a centerless grinding machine so that one or more previously machined diameters of the stock may be ground on either or both sides of a shoulder to a predetermined diameter and a mechanism effective to thereafter automatically discharge each workpiece upon completion of the desired grinding operation.

In the device, the stock shafts or workpieces are fed into the chute 30 and under force of gravity slide down the chute 30 resting on the previously machined shoulders of the stock shafts. The stock shafts are controlled by the pin device 50 operated by the mechanism in such a manner as to feed one stock shaft at a time onto the two carrying arms 59 and 61 of Figure 4 which arms are controlled by the operative mechanism so as to carry stock shaft 36A to the work rest blade 24 between the grinding wheel 16 and the regulating wheel 20, as indicated in Figure 2. Thereafter the arms 59 and 61 are retracted so as to receive a new stock shaft.

Upon completion of the grinding operation, a notch 125 in the regulating wheel 20 is rotatably positioned adjacent the work rest blade 24 so that the completed stock shaft 36B may be deposited therein, as indicated in Figure 2, and in turn carried for discharge from the slot 125 into a receiving pan 127, as indicated in Figure 1. After the regulating wheel 20 has rotated the slot 125 past the work rest blade 24, the preceding operation is repeated and the next succeeding stock shaft is in turn carried by the arms 59 and 61 to the work rest blade 24. The automatic feeding operation of the stop pin device 50 and carrying arms 59 and 61 are in timed relation with the discharge operation of the slot 125 in the regulating wheel 20 through the arrangement of the cam 63 and actuating arm 65 of the operating mechanism.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a mechanism of a type including a rotatable grinding wheel and a work rest blade for supporting a workpiece adjacent the grinding wheel so as to be ground thereby; means for feeding a workpiece to the work rest blade, comprising a chute for carrying a plurality of workpieces, releasable stop means to limit movement of the workpieces in the chute, a pair of movable arms, operating means to actuate said stop means so as to release a workpiece from the chute upon said arms being in an initial position to receive said workpiece, means thereafter actuated by said operating means to arcuately move the arms from said initial position so as to cause said arms to carry the workpiece received from the chute to the work rest blade, cam means effective during the arcuate movement of the arms adjacent said blade for pivotally actuating the arms so as to cause the arms to release and deposit the workpiece at the blade so that the workpiece may thereafter be ground by the grinding wheel, and other means for returning the arms to the initial position after the release and deposit of the workpiece at the blade.

2. In a mechanism of a type including a rotatable grinding wheel and a work rest blade for supporting a workpiece adjacent the grinding wheel so as to be ground thereby; means for feeding a workpiece to the work rest blade, said feeding means comprising a chute for carrying a plurality of workpieces slidable therein under gravitational force, a stop pin device for limiting movement of the workpieces in said chute, and feeder arms initially positioned adjacent the chute and arranged to carry a workpiece from the chute to the work rest blade; operating means for the feeder arms, cam control means for actuating the stop pin device, means operatively connecting the cam control means to said feeder arms, said connecting means being actuated by said operating means to cause the cam control means to effectively position the pin device in synchronism with the feeder arms so as to release a workpiece from the chute onto the feeder arms, said operatively connected means being thereafter actuated by said operating means so as to cause the cam control means to effectively position the pin device so as to limit movement of the workpieces in said chute while said operating means thereafter positions the feeder arms so as to carry the workpiece thereon to the work rest blade.

3. The combination defined by claim 2 including other cam means rendered effective to pivotally actuate said feeder arms upon movement of said feeder arms to a position adjacent said work rest blade and to thereby cause said feeder arms to release the workpiece onto said work rest blade, whereupon said operating means is thereafter effective to actuate the feeder arms so as to return to the initial position adjacent the chute and cam control means to position the pin device so as to release a workpiece from the chute onto the feeder arms.

4. In a centerless grinder of a type including a grinding wheel, a regulating wheel and a work rest blade between the grinding wheel and the regulating wheel; the improvement comprising a chute for carrying a plurality of workpieces, releasable stop pin means to limit movement of the workpieces in the chute, a hub element, a main control arm pivotally mounted in the hub element, a pair of feeder arms projecting from the main control arm, first operating means controlled by said regulating wheel, said first operating means being effective to actuate said stop pin means so as to release a workpiece from the chute upon said feeder arms being in an initial position to receive said workpiece, second operating means thereafter actuated by said first operating means under control of said regulating wheel to rotate said hub element so as to arcuately move said main control arm from the initial position so as to cause said feeder arms to carry the workpiece received from the chute to the work rest blade, cam means effective during the arcuate movement of the feeder arms adjacent said blade for pivotally actuating the control arm relative to the hub element to cause the feeder arms to release and deposit the workpiece at the blade so that the workpiece may thereafter be ground by the grinding wheel, said second operating means controlled by the first operating means and said regulating wheel so as to return the feeder arms to the initial position after the release and deposit of the workpiece at the blade, said first operating means being effective upon the return of said feeder arms to the initial position to simultaneously actuate said stop pin means so as to release a second workpiece to said feeder arms, said regulating wheel having a slot therein periodically positioned by the regulating wheel adjacent the blade for receiving the first-mentioned workpiece from the blade after the first workpiece had been ground for a predetermined period of time, said regulating wheel thereafter controlling said first operating means so as to arcuately move said feeder arms from the initial position in such a manner as to cause said feeder arms to carry the second workpiece received from the chute to the work rest blade while said regulating wheel continues to carry the first workpiece in said slot, said regulating wheel being thereafter rotated to a position at which said slot discharges said first workpiece, and means for receiving said discharged workpiece.

5. An automatic feeder for a machine having a work treating station which comprises an inclined feeder track having workpieces for a gravity discharge, a hub element, a main control arm pivotally mounted in the hub element, swingable loader arms projecting from the main control arm, said loader arms having hook-like end portions to periodically receive a workpiece from said feeder track, stop pin means to control the discharge of the workpiece from the feeder track to the hook-like end portions of the loader arms, control mechanism to periodically rotate the hub element in one direction so as to move the loader arms between the discharge end of said track and said work treating station so as to convey the workpiece to the work treating station, cam means to pivot said main control arm relative to said hub element so as to cause said hook-like elements to discharge said workpiece at said treating station, a rotary conveyor means having a workpiece receiving portion periodically positioned adjacent the work treating station of said machine to move the workpiece after a predetermined period at the work treating station to a point of discharge, said control mechanism including means to rotate said hub element in an opposite direction so as to swingably return the loader arms from the work treating station to the feeder track for reloading, and means to drivingly connect said rotary conveyor means to said control mechanism in such a manner as to maintain a predetermined relation between the loading of the workpiece at the work treating station and the discharge of the workpiece from the work treating station.

6. The combination defined by claim 5 including means operatively connecting the control mechanism to said stop pin means so as to cause the stop pin means to be withdrawn to effect the discharge of a workpiece from the feeder track to the loader arms upon the return of the loader arms from the work treating station to the feeder track and thereafter bias the stop pin means to a position effective to prevent discharge of other of the workpieces from the feeder track during movement of the loader arms from the discharge end of the feeder track.

7. In an automatic feeder for a machine having a work treating station, and workpiece supply means; the improvement comprising loader means to periodically receive a workpiece from the supply means, said loader means including a hub element, a main control arm pivotally mounted in the hub element, auxiliary arms projecting from the main control arm, two of the auxiliary arms having hook-shaped members at the free ends thereof initially so positioned as to receive a workpiece from the supply means, operative means to arcuately move the main control arm so as to cause said two auxiliary arms to carry the workpiece at said hook-shaped members from the supply means to the work treating station, a third auxiliary arm, a cam element contactable by the third auxiliary arm upon said arcuate movement of the main control arm whereupon said cam element causes a pivotal movement of the main control arm relative to said hub element so as to cause the hook-shaped members to release the workpiece carried thereby at the work treating station.

8. The combination defined by claim 7 including first spring means to arcuately bias said main control arm in opposition to said arcuate movement, second spring means to pivotally bias said main control arm in opposition to said pivotal movement relative to said hub element, and said operative means including driving means cooperating with said hub element and said main control arm in such a manner that upon the hook-shaped members releasing the workpiece at the work treating station the main control arm is moved under the biasing force of the first and second spring means in such a manner that the auxiliary arms are retracted to the initial position for reloading at the workpiece supply means.

References Cited in the file of this patent

UNITED STATES PATENTS

| | | |
|---|---|---|
| 1,850,054 | Strickland | Mar. 15, 1932 |
| 1,932,952 | Binns | Oct. 31, 1933 |
| 2,427,283 | Hopkins | Sept. 9, 1947 |
| 2,809,471 | Jones | Oct. 15, 1957 |
| 2,874,518 | Balsiger | Feb. 24, 1959 |